United States Patent
Sun et al.

(10) Patent No.: US 8,574,341 B2
(45) Date of Patent: Nov. 5, 2013

(54) METHOD FOR RECYCLING METALS FROM WASTE TUNGSTEN CATALYSTS

(75) Inventors: Yu-Lung Sun, Kaohsiung (TW);
Ming-Zhe Tsai, Kaohsiung (TW);
Yung-Hao Liu, Kaohsiung (TW)

(73) Assignee: Hong Jing Metal Corporation, Kaohsiung (TW)

( * ) Notice: Subject to any disclaimer, the term of this patent is extended or adjusted under 35 U.S.C. 154(b) by 152 days.

(21) Appl. No.: 13/167,377

(22) Filed: Jun. 23, 2011

(65) Prior Publication Data
US 2012/0279355 A1    Nov. 8, 2012

(30) Foreign Application Priority Data
May 6, 2011   (TW) .............................. 100115996 A

(51) Int. Cl.
C22B 3/06    (2006.01)
C22B 3/10    (2006.01)

(52) U.S. Cl.
USPC ............................................ 75/743; 75/413

(58) Field of Classification Search
USPC ................................... 75/743, 416
See application file for complete search history.

(56) References Cited

U.S. PATENT DOCUMENTS

| | | | | |
|---|---|---|---|---|
| 4,343,774 A | * | 8/1982 | Tilley | 423/53 |
| 4,657,745 A | * | 4/1987 | Hyatt | 423/53 |
| 5,431,892 A | | 7/1995 | Toyabe et al. | |
| 7,182,926 B2 | | 2/2007 | Akahoshi | |
| 7,837,960 B2 | * | 11/2010 | Bhaduri et al. | 423/56 |

FOREIGN PATENT DOCUMENTS

| | | |
|---|---|---|
| CN | 1865460 A | 11/2006 |
| GB | 2465175 A  * | 5/2010 |

* cited by examiner

Primary Examiner — George Wyszomierski
Assistant Examiner — Tima M McGuthry Banks
(74) Attorney, Agent, or Firm — Muncy, Geissler, Olds & Lowe, PLLC

(57) ABSTRACT

A method for recycling metals from waste tungsten catalysts comprises steps of: leaching, by soaking a waste tungsten catalysts into a highly oxidized acid and conducting a reaction between sulfur of the waste tungsten catalysts and the acid to obtain sulfide and oxidized acidic groups, wherein metals in the waste tungsten catalysts are dissolved and oxidized by the acid to obtain a first solution and dregs; and refining, by extracting metals of the waste tungsten catalysts from the first solution; wherein, the oxidized acidic groups obtained from the step of leaching is converted into highly oxidized acid, which is capable of being recycled.

16 Claims, 3 Drawing Sheets

METHOD FOR RECYCLING METALS FROM WASTE TUNGSTEN CATALYSTS

BACKGROUND OF THE INVENTION

1. Field of the Invention

The present invention relates to a method for recycling metals from waste catalysts, particularly to a method for recycling metals from waste tungsten catalysts by using a highly oxidized acid.

2. Description of the Related Art

In oil-refining industry, catalysts, particular to tungsten catalyst, have been widely used in hydro-desulphurization process. Generally, the tungsten catalyst has a carrier of γ-alumina, with the carrier of alumina to immobilize metals on its surfaces. Accordingly, the tungsten catalyst is easy to be ineffective due to the contamination and absorption of mass iron or phosphorus during catalysis process. Therefore, a great amount of waste tungsten catalysts are generated during the processes of oil-refining, and which may lead to serious pollutions or ecological crisis if a proper treatment of those waste catalysts has not been gone through.

Generally, waste tungsten catalysts are rich in metals, which are capable of being recycled and reused in industries. More particularly, the waste tungsten catalysts collected from various batches of hydro-desulphurization processes contains diverse composition of metals, for example, tungsten, molybdenum and nickel; tungsten and molybdenum; or tungsten and nickel; even having aluminum obtained from the surfaces of the carrier of γ-alumina. With such propose, it is a need of providing a method for recycling metals from waste tungsten catalysts, for the sake of obtaining a dramatic amount of metals from the waste tungsten catalysts and further applying recycled metals in diverse industries.

A conventional technique for recycling tungsten and molybdenum as disclosed in China Patent No. CN101824533A and entitled "METHOD FOR EXTRACTING TUNGSTEN AND MOLYBDENUM TRIOXIDE BY PRETREATING TUNGSTEN-MOLYBDENUM CONCENTRATES WITH CONCENTRATED ACID", comprises steps of preparing by strong acid; leaching; recycling molybdenum; roasting and obtaining molybdenum trioxide, aminosoaking; condensing; cooling; roasting and obtaining tungsten trioxide, in order to extract molybdenum trioxide and tungsten trioxide from the tungsten-molybdenum concentrates.

However, the steps of the conventional technique are complicated and time-consuming, not only obtaining metals in low quality and efficiency, but being wasteful in use of acid and lye. Furthermore, the conventional technique is insufficient to recycle metals from waste tungsten catalyst due to the diversity of metals (such as nickel and aluminum) in the waste tungsten catalyst. Particularly, nickel and aluminum of the waste tungsten catalyst is difficult to be recycled or removed via sodium-roasting processes, and which may interfere with the recycling process of molybdenum and tungsten of the conventional technique. Therefore, the recycling rate, as well as the quality of recycling, of molybdenum and tungsten in the conventional technique is low and poor. On the other hand, the waste tungsten has sulfur or sulfide obtained from hydro-desulphurization processes. Sulfur or sulfide of the waste tungsten catalyst is easy to diffuse and lead to serious contamination or pollution on air or eater resource during the process in the steps of the conventional technique.

In conventional arts, there is a method to recycle metal from waste tungsten catalyst by roasting a waste tungsten catalyst at 600-900° C. for 0.5-2 hours, soaking the waste tungsten catalyst in water at 80-90° C. of hot water, and then further soaking the water tungsten catalyst in an acid to recycle nickel and cobalt and to obtain a residue after recycling. Moreover, tungsten and molybdenum can also be recycled from the residue by adding barium hydroxide or barium aluminate into the residue to obtain sodium aluminate solution, and sequentially isolating tungsten and molybdenum from the sodium aluminate solution. In this way, the recycling rate of metals in aluminum catalyst will achieve 91%.

Although the method above can effectively recycled diverse metals from waste catalyst, sulfur or sulfide will still remain in the waste catalysts and result in contamination and pollutions on air or water resource. Moreover, an additional oxidization of tungsten and molybdenum is needed for extracting tungsten and molybdenum from the waste catalysts, and however, the oxidization of tungsten and molybdenum may increase the impurity thereof and diminish the recycling rate of tungsten and molybdenum as well.

Additionally, the waste catalyst has a great amount of aluminum, with the result in interfering with the recycling of tungsten, nickel and molybdenum from the waste catalysts. In conventional arts, aluminum in the waste catalysts have to be additionally recycled by aerating carbon dioxide into the sodium aluminate solution, followed by roasting the sodium aluminate solution at a high temperature to obtain alumina. In this situation, the recycled metals only can be obtained in a time-and-cost consuming process, with poor quality and low recycling rate. It is suggested that, the conventional techniques has plenty of disadvantages and inconvenience, and therefore there is an urgent need of improving the conventional technique for recycling metals from waste catalysts.

SUMMARY OF THE INVENTION

The primary objective of this invention is to provide a method for recycling metals from waste tungsten catalysts, which can effectively remove sulfur and sulfide from waste tungsten catalysts so as to avoid pollutions caused by the contamination of sulfur or sulfide.

The secondary objective of this invention is to provide a method for recycling metals from waste tungsten catalysts, which can directly recycle metals in oxidization state, so that the difficulty of the recycling processes will be reduced but the recycling rate of metals will be promoted.

Another objective of this invention is to provide a method for recycling metals from waste tungsten catalysts, which can avoid the negative effects caused by aluminum during the recycling of metals so as to improve the quality of recycled metals.

Another objective of this invention is to provide a method for recycling metals from waste tungsten catalysts, which can directly obtain metallic dregs in oxidization state from the waste tungsten catalysts, so that a higher recycling rate of metals can be achieved in a time-and-cost saving process.

Another objective of this invention is to provide a method for recycling metals from waste tungsten catalysts, which can directly recycle oxidized dianions obtained from a reaction between sulfur in waste tungsten catalysts and acid, so as to be significantly frugal in acid use.

A method for recycling metals from waste tungsten catalysts comprises steps of: leaching, by soaking a waste tungsten catalysts into a highly oxidized acid and conducting a reaction between sulfur of the waste tungsten catalysts and the acid to obtain sulfide and oxidized acidic groups, wherein metals in the waste tungsten catalysts are dissolved and oxidized by the acid to obtain a first solution and dregs; and refining, by extracting metals of the waste tungsten catalysts from the first solution; wherein, the oxidized acidic groups obtained from the step of leaching is converted into highly oxidized acid, which is capable of being recycled.

A method for recycling metals from waste tungsten catalysts comprises steps of: leaching, by soaking a waste tungsten catalysts into a highly oxidized acid and conducting a reaction between sulfur of the waste tungsten catalysts and the acid to obtain sulfide and oxidized acidic groups, wherein metals in the waste tungsten catalysts are dissolved and oxidized by the acid to obtain a first solution and dregs; and roasting, by roasting the dregs till ripening, soaking ripened dregs into water to obtain a second solution, and extracting metals of the waste tungsten catalyst from the second solution; wherein, the oxidized acidic groups obtained from the step of leaching is converted into highly oxidized acid, which is capable of being recycled.

Further scope of the applicability of the present invention will become apparent from the detailed description given hereinafter. However, it should be understood that the detailed description and specific examples, while indicating preferable embodiments of the invention, are given by way of illustration only, since various will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

Figure 1:
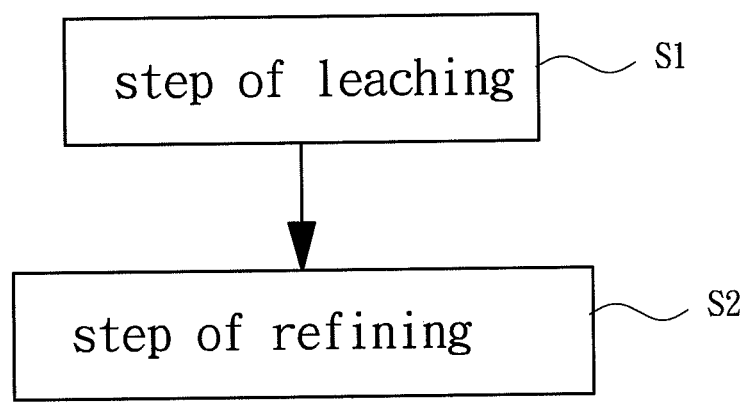
FIG. 1 is a diagram illustrating a first embodiment of a method for recycling metals from waste tungsten catalysts in the present invention.

All figures are drawn for ease of explaining the basic teachings of the present invention only; the extensions of the figures with respect to number, position, relationship, and dimensions of the parts to form the preferred embodiment will be explained or will be within the skill of the art after the following teachings of the present invention have been read and understood. Further, the exact dimensions and dimensional proportions conforming to specific force, weight, strength, and similar requirements will likewise be within the skill of the art after the following teachings of the present invention have been read and understood. Furthermore, when the term "first", "second" and similar terms are used hereinafter, it should be understood that these terms are reference only to the structure shown in the drawings as it would appear to a person viewing the drawings and are utilized only to facilitate describing the invention.

DETAILED DESCRIPTION OF THE INVENTION

In accordance with FIG. 1, a first embodiment of a method for recycling metals from waste tungsten catalysts in the present invention is shown and comprises a step of "leaching S1," and a step of "refining S2," wherein the waste tungsten catalysts of the present invention are mainly collected from various processes in petrifaction, such as processes of hydro-desulphurization, hydro-refining and hydro-cracking, preferably from a hydro-desulphurization unit. In general, waste tungsten catalysts collected from various batches of the hydro-desulphurization unit contains diverse compositions of metals, for example, tungsten, molybdenum and nickel; tungsten and molybdenum; or tungsten and nickel; even having aluminum obtained from the surfaces of the carrier of γ-alumina. As an example, the waste tungsten catalyst selected and used in the present invention comprises tungsten, molybdenum, nickel, aluminum, and sulfur.

In the step of "leaching S1," a waste tungsten catalyst is prepared and soaked into a highly oxidized acid to conduct a reaction between sulfur in the waste tungsten catalysts and the acid, in order to obtain sulfide and vaporizer. In this situation, metals in the waste tungsten catalysts are dissolved and oxidized by the acid to generate a first solution and dregs, wherein the first solution and the dregs comprise metallic oxides. Furthermore, the vaporizer obtained from the step of "leaching S1" can be converted into acid and further recycled in the step of "leaching S1".

More precisely, the waste tungsten catalyst of the present invention has tungsten, molybdenum, nickel, aluminum, and sulfur or sulfide obtained from the hydro-desulphurization in any possible ratio. Accordingly, sulfur of the waste tungsten catalysts will completely interact with the acid to generate the sulfide and the vaporizer. Moreover, the sulfide will increase the acidity of the acid so that the dissolution of metals of the waste tungsten catalysts can be promoted. Also, the vaporizer of the present invention is oxidized acidic groups, which is capable of being converted into acid and further recycled in the present invention so as to be frugal in use of the acid in the step of "leaching S1".

At the mean time, metals, such as tungsten, molybdenum, nickel, and rare aluminum of the waste tungsten catalyst are dissolved in the acid to obtain the first solution, which has plenty amount of tungsten, molybdenum, nickel but rare aluminum. On the other hand, residual metals, such as aluminum and rare tungsten, molybdenum and nickel, in the waste tungsten catalysts are remained and become the dregs, being solid and comprising a significant amount of aluminum and rare tungsten, molybdenum and nickel. Then, tungsten, molybdenum, nickel, aluminum, and a slight amount of sulfur rather in the first solution or in the dregs are completely oxidized by the acid to generate sulfur dioxide, tungsten oxide and molybdenum oxide. The tungsten oxide and molybdenum oxide will be easy to be extracted in the next steps. Also, the sulfur dioxide has higher vaporization point, and which is less possible to diffuse through the processes of the steps of "refining S2" and "roasting S3". In the present invention, the acid can be nitric acid, chloric acid, nitrous acid, sulfuric acid, hypochlorous acid, chlorous acid, perchloride acid.

With reference of REACTIONS 1 and 2, being an example of the present embodiment, a waste tungsten catalyst containing 5% of aluminum, 13.7% of tungsten, 8.8% of molybdenum, 8.2% of nickel, and sulfur or sulfide, is prepared and soaked into 5-40% of nitric acid for 2 to 4 hours, with a weight ratio of nitric acid and waste tungsten catalyst being 1-4, and then, a reaction between sulfur of the waste tungsten catalyst and the nitric acid is conducted to generate sulfuric acid and vapored $NO_3^-$. With such arrangement, the vapored $NO_3^-$ obtained from the said reaction can be collected via an air-extracting apparatus, and which is capable of being recycled and further applied in the step of "leaching S1" in the present invention. Furthermore, a solution contained a great amount of tungsten oxide, molybdenum oxide, nickel oxide but rare alumina oxide, and dregs contained rare amount of tungsten oxide, molybdenum oxide, nickel oxide but a great amount of alumina oxide, are also obtained in the step of "leaching S1,"

wherein the solution and the dregs can be further processed in the step of "refining S2" or the step of "roasting S3" respectively to recycle tungsten, molybdenum, nickel, and aluminum from the solution and the dregs.

   REACTION 1

   REACTION 2

In the step of "refining S2," metals of the waste tungsten catalyst are extracted from the first solution obtained from the step of "leaching S1". Precisely, in the step of "refining S2," tungsten, molybdenum, nickel and aluminum are sequentially recycled by processes of: providing an extraction solvent, an alkaline solvent and an acid solvent; extracting tungsten and molybdenum from the first solution by using the extraction solvent, and obtaining a first extract; with the performance of the alkaline solvent further extracting tungsten and molybdenum from the first extract to obtain a second extract, recycling tungsten and molybdenum from the second extract and obtaining a residue after recycling; extracting aluminum from the residue by the extraction solvent to obtain a third extract; recycling aluminum from the third extract by the acid solvent and obtain a leftover after recycling; and finally recycling nickel directly from the leftover.

With such arrangement, around 70-95% of tungsten, molybdenum, and nickel can be recycled from the first solution obtained from the step of "leaching S1" in the step of "refining S2" in the present invention. Wherein, the extraction solvent of the present embodiment can be N-235, alamine 336, aliquot 306, P204, P507, N236, cyaney, TOA, or their combination; the alkaline solvent of the present embodiment can be sodium chloride, sodium carbonate or sodium hydroxide; the acid solvent of the present embodiment can be nitric acid, sulfuric acid, hydrochloric acid or phosphoric acid.

Figure 2:
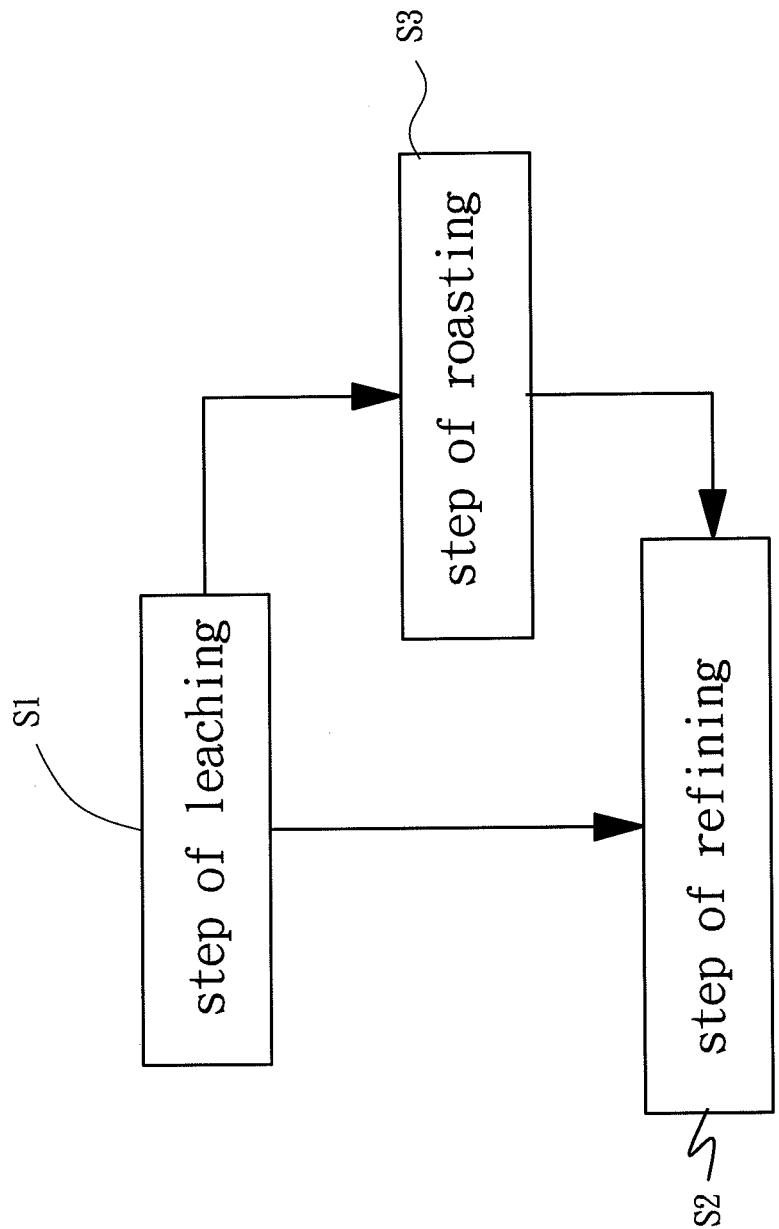
FIG. 2 is a diagram illustrating a second embodiment of a method for recycling metals from waste tungsten catalysts in the present invention.

With reference to FIG. 2, a second embodiment of the method for recycling metals from waste tungsten catalysts is summarized. In comparison with the first embodiment of the present invention, the present embodiment further comprises a step of "roasting S3" after the step of "leaching S1", and more particularly, the step of "roasting S3" can be performed either before the step of "refining S2," or at the same time of the step of "refining S2".

In the step of "roasting S3," the dregs obtained from the step of "leaching S1" is sequentially roasted till ripening and soaked in water, to extract metals of the waste tungsten catalyst from the dregs. More precisely, the dregs obtained from the step of "leaching S1" and alkaline powders are mixed and roasted at 300-800° C., preferably at 600-700° C., for 1 hour to obtained ripening dregs, followed by soaking the ripening dregs into hot water to obtain a second solution and extracting tungsten, molybdenum, nickel, and aluminum from the second solution via the same processes of the step of "refining S2" above. With such performance, the majority of tungsten, molybdenum, nickel and aluminum can be recycled and obtained from the dregs. The alkaline powders of the present embodiment can be sodium carbonate, sodium hydroxide or sodium chloride.

Figure 3:
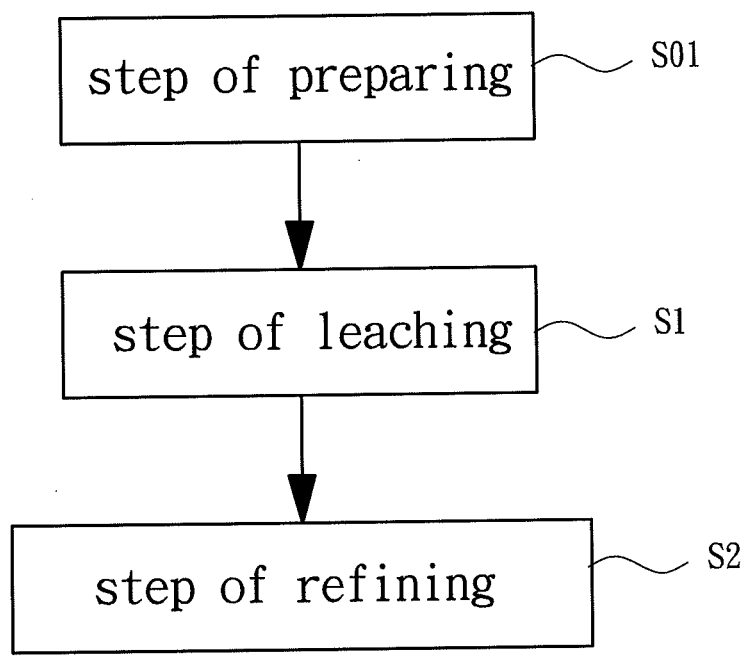
FIG. 3 is a diagram illustrating a third embodiment of a method for recycling metals from waste tungsten catalysts in the present invention.

Additionally, in accordance with FIG. 3, a third embodiment of a method for recycling metals from waste tungsten catalysts in the present invention further comprises a step of "preparing S01" before the step of "leaching S1," and in which heavy oil remained on the waste tungsten catalysts is removed. More precisely, the waste tungsten catalyst is placed into a reactor, under 150-800° C. to remove the heavy oil from the waste tungsten catalyst. In this way, the negative effects of the heavy oil on the step of "leaching S1" will be avoided, so as to promote the dissolution of metals in the acid.

Additionally, an assist acid can be further provided and used in the step of "leaching S1," with the performance of the assist acid advancing the acidity of the acid, so that the dissolution rate of metals can be significantly promoted. In the present invention, the assist acid can be hydrochloric acid, sulfuric acid or other strong acids, preferably at a concentration of 1-50% in the acid.

Through the present invention, the method for recycling metals from waste tungsten catalyst is provided, by soaking the waste tungsten catalyst in the acid, with the high oxidation of the acid directly reacting with sulfur in the waste tungsten catalyst to produce sulfide and vaporizer, and further oxidizing metals in the waste tungsten catalyst, including tungsten, molybdenum, nickel and aluminum; and extracting metallic oxides, such as tungsten oxide and molybdenum oxide from the waste tungsten catalyst. Wherein, the vaporizer obtained from the present invention is converted to acid and is capable of being recycled in the step of "leaching S1" of the present invention, not only can maintain the acidity of the acid, but also can advance the dissolution of metals in the acid. Furthermore, the sulfide obtained from the present invention is in oxidization state, being uneasy to vapor, and therefore, the ecological crisis caused by contamination of vapored sulfide will be successfully avoided.

In additional, metals of the waste tungsten catalyst are oxidized into metallic oxides in the present invention, so that those metals are easier to be extracted whatever from the first solution or solid dregs. As regard the high temperature for recycling tungsten, molybdenum, aluminum and nickel from the waste tungsten catalysts in the conventional arts (more than 850° C. for example), it is no longer needed. Therefore, the method for recycling metals from waste tungsten catalysts of the present invention is sufficient to recycle metals with high quality and efficiency in a cost-and-time saving process.

In order to verify the benefits of the method for recycling metals from waste tungsten catalysts in the present invention, a waste tungsten catalyst and nitric acid are prepared to carry out the recycling processes of the present invention. In the following paragraphs, the recycling rate of tungsten, molybdenum, nickel and aluminum from the waste tungsten catalyst is demonstrated under various conditions of processes, such as with different weight ratio of the nitric acid and the waste tungsten catalyst, with different concentration of the nitric acid, and with/without assist acid, hydrochloride acid for example.

In TABLE 1, 1000 grams of waste tungsten catalyst are soaked into 20% of nitric acid for 4 hours, with the weight ratio of the nitric acid and the waste tungsten catalyst being 1, 2, 3, or 4 respectively, to extract metals, including tungsten, molybdenum, nickel and aluminum, from the waste tungsten catalyst, and then the contents of residues obtained after the extracting are analyzed and listed.

TABLE 1

Contents of Residues under Various Ratios of Waste Tungsten Catalyst and Nitric Acid

| | Ratio of Waste Tungsten Catalyst and Nitric Acid | | | |
|---|---|---|---|---|
| | 1:1 | 2:1 | 3:1 | 4:1 |
| Aluminum(g) | 48.1 | 47.5 | 47 | 47 |
| Tungsten(g) | 21.9 | 1.35 | 0.13 | 0.13 |
| Molybdenum(g) | 15 | 0.81 | 0.08 | 0.07 |
| Nickel(g) | 14 | 0.5 | 0.05 | 0.05 |

As it is shown in TABLE 1, it is note that tungsten, molybdenum, nickel and aluminum are all recycled in a superior efficiency in the present invention, with a recycling rate even more than 99%, when the waste tungsten catalyst is soaked into at least 2 times weights of nitric acid.

In TABLE 2, 1000 grams of waste tungsten catalyst are soaked into 5%, 10%, 20%, 30%, or 40% of nitric acid respectively for 4 hours, with the ratio of the nitric acid and the waste tungsten catalyst being 3, to extract metals, including tungsten, molybdenum, nickel and aluminum from the waste tungsten catalyst, and then the contents of residue obtained after the extracting are analyzed and listed.

TABLE 2

Contents of Residues under Various Concentration of Nitric Acid

| | Concentration of Nitric Acid (%) | | | | |
|---|---|---|---|---|---|
| | 5 | 10 | 20 | 30 | 40 |
| Aluminum(g) | 49 | 47.9 | 47 | 46.1 | 46 |
| Tungsten(g) | 26.1 | 1.3 | 0.13 | 0.1 | 0.1 |
| Molybdenum(g) | 17 | 0.77 | 0.08 | 0.06 | 0.05 |
| Nickel(g) | 16 | 0.77 | 0.05 | 0.03 | 0.02 |

Referring to TABLE 2, it is shown that tungsten, molybdenum, nickel and aluminum are all recycled in a high efficiency in the present invention, with a recycling rate even more than 99% as the waste tungsten catalyst is soaked into 10%-40% of nitric acid.

According to data in TABLEs 1 and 2, it is proved that with the performance of the nitric acid in the present invention, the recycling rate of metals, such as tungsten, molybdenum, and nickel from the waste tungsten catalyst can be significantly promoted, but the cost for recycling metals from the waste tungsten catalyst will be reduced. On the other hand, in TABLEs 1 and 2, the residues obtained after the extracting has 90-95% of aluminum. It is suggested that the recycled tungsten, molybdenum and nickel will not be contaminated by aluminum, so that the quality of the recycled tungsten, molybdenum and nickel is successfully maintained. Also, the residues contain less than 2% of sulfur. It is believed that sulfur in the waste tungsten catalyst are converted into sulfuric acid, and mixed up with the acid.

In TABLE 3, 1000 grams of waste tungsten catalyst are soaked into 20% of nitric acid and 0, 1%, 10%, 25%, or 50% of hydrochloric acid respectively for 4 hours, with the ratio of the nitric acid and the waste tungsten catalyst being 3, to extract metals, including tungsten, molybdenum, nickel and aluminum, from the waste tungsten catalyst, and then the recycling rate of tungsten, molybdenum, nickel and aluminum are analyzed and summarized.

TABLE 3

Recycling Rates of Metals under Various Concentration of HCl

| | Concentration of Hydrochloric Acid (%) | | | | |
|---|---|---|---|---|---|
| | 0 | 1 | 10 | 25 | 50 |
| Aluminum(g) | 4.4 | 5.1 | 5.6 | 5.5 | 6.7 |
| Tungsten(g) | 71.4 | 73.3 | 75 | 75.2 | 78.5 |
| Molybdenum(g) | 70 | 70.7 | 74 | 75.4 | 77.5 |
| Nickel(g) | 90 | 92.1 | 95.1 | 95.5 | 97.2 |

According to TABLE 3, with the performance of the hydrochloric acid and nitric acid, tungsten, molybdenum and nickel are all recycled in high efficiency. It is suggested that the assist acid, for example hydrochloric acid, sulfuric acid or other strong acid is capable of promoting the recycling rate of tungsten, molybdenum and nickel from the waste tungsten catalyst in the present invention.

In summary, with the method for recycling metals from waste tungsten catalysts in the present invention, it is beneficial to improve environmental pollutions on air or water resource caused by contamination of sulfur or sulfide, to simplify the process of recycling, and to reduce the use of acid during the cycling process, so as to obtain recycled metals in high efficiency and superior quality.

Although the invention has been described in detail with reference to its presently preferred embodiment, it will be understood by one of ordinary skill in the art that various modifications can be made without departing from the spirit and the scope of the invention, as set forth in the appended claims.

What is claimed is:

1. A method for recycling metals from waste tungsten catalysts, comprising steps of:
   leaching, by soaking a waste tungsten catalysts into a highly oxidized acid and conducting a reaction between sulfur of the waste tungsten catalysts and the acid to obtain sulfide and oxidized acidic groups, wherein metals in the waste tungsten catalysts are dissolved and oxidized by the acid to obtain a first solution and dregs, wherein the highly oxidized acid is selected from one of nitric acid, hydrochloric acid, nitrous acid, hypochlorous acid, chlorous acid and perchloride acid; and
   refining, by extracting metals of the waste tungsten catalysts from the first solution;
   wherein, the oxidized acidic groups obtained from the step of leaching is converted into highly oxidized acid, which is capable of being recycled.

2. The method for recycling metals from waste tungsten catalysts as defined in claim 1, with a step of roasting being performed after the step of leaching, in which the dregs are roasted till ripening, followed by soaking the ripened dregs into water to obtain a second solution, and extracting metals of the waste tungsten catalysts from the second solution.

3. The method for recycling metals from waste tungsten catalysts as defined in claim 2, wherein, an assist acid, being a strong acid, is further added into the highly oxidized acid in the step of leaching.

4. The method for recycling metals from waste tungsten catalysts as defined in claim 2, with the temperature of the step of roasting being set up at 300° C. to 800° C.

5. The method for recycling metals from waste tungsten catalysts as defined in claim 1, wherein, an assist acid, being a strong acid, is further added into the highly oxidized acid in the step of leaching.

6. The method for recycling metals from waste tungsten catalysts as defined in claim 5, with the concentration of the assist acid in the acid being set up at 1 wt % to 50 wt %.

7. The method for recycling metals from waste tungsten catalysts as defined in claim 5, with the weight ratio between the acid and the waste tungsten catalysts being set up at 1 to 4.

8. The method for recycling metals from waste tungsten catalysts as defined in claim 5, with the concentration of the highly oxidized acid being set up at 5% to 40%.

9. The method for recycling metals from waste tungsten catalysts as defined in claim 1, wherein the waste tungsten catalysts consists essentially of metals of tungsten, molybdenum, nickel and aluminum; tungsten, molybdenum and aluminum; or tungsten, nickel and aluminum.

10. A method for recycling metals from waste tungsten catalysts comprising steps of:

leaching, by soaking a waste tungsten catalysts into a highly oxidized acid and conducting a reaction between sulfur of the waste tungsten catalysts and the acid to obtain sulfide and oxidized acidic groups, wherein metals in the waste tungsten catalysts are dissolved and oxidized by the acid to obtain a first solution and dregs, wherein the highly oxidized acid is selected from one of nitric acid, hydrochloric acid, nitrous acid, hypochlorous acid, chlorous acid and perchloride acid; and roasting, by roasting the dregs till ripening, soaking ripened dregs into water to obtain a second solution, and extracting metals of the waste tungsten catalyst from the second solution;

wherein, the oxidized acidic groups obtained from the step of leaching is converted into highly oxidized acid, which is capable of being recycled.

11. The method for recycling metals from waste tungsten catalysts as defined in claim 10, wherein an assist acid, being a strong acid, is further added into the highly oxidized acid in the step of leaching.

12. The method for recycling metals from waste tungsten catalysts as defined in claim 11, with the concentration of the assist acid in the acid being set up at 1 wt % to 50 wt %.

13. The method for recycling metals from waste tungsten catalysts as defined in claim 10, with the weight ratio between the acid and the waste tungsten catalysts being set up at 1 to 4.

14. The method for recycling metals from waste tungsten catalysts as defined in claim 10, with the concentration of the highly oxidized acid being set up at 5% to 40%.

15. The method for recycling metals from waste tungsten catalysts as defined in claim 10, wherein the waste tungsten catalysts consists essentially of metals of tungsten, molybdenum, nickel and aluminum; tungsten, molybdenum and aluminum; or tungsten, nickel and aluminum.

16. The method for recycling metals from waste tungsten catalysts as defined in claim 10, with the temperature of the step of roasting being set up at 300° C. to 800° C.

* * * * *